(12) United States Patent
Sawai et al.

(10) Patent No.: US 7,434,944 B2
(45) Date of Patent: Oct. 14, 2008

(54) IMAGE PROJECTION APPARATUS

(75) Inventors: Yasumasa Sawai, Yamatotakada (JP);
Tomiei Kuwa, Musashino (JP)

(73) Assignee: Konica Minolta Opto, Inc.,
Hachioji-Shi (JP)

( * ) Notice: Subject to any disclaimer, the term of this patent is extended or adjusted under 35 U.S.C. 154(b) by 410 days.

(21) Appl. No.: 11/209,793

(22) Filed: Aug. 23, 2005
(Under 37 CFR 1.47)

(65) Prior Publication Data
US 2006/0192902 A1 Aug. 31, 2006

(30) Foreign Application Priority Data

Sep. 1, 2004 (JP) .............................. 2004-253716
Aug. 17, 2005 (JP) .............................. 2005-236612

(51) Int. Cl.
*G03B 21/28* (2006.01)
(52) U.S. Cl. ........................ 353/99; 353/51; 348/771; 348/782
(58) Field of Classification Search .................. 353/94, 353/98, 99, 37; 348/771, 782–785; 359/850, 359/857–859, 727
See application file for complete search history.

(56) References Cited

U.S. PATENT DOCUMENTS

| | | | |
|---|---|---|---|
| 5,871,266 A | 2/1999 | Negishi et al. ................. 353/98 |
| 6,523,961 B2 | 2/2003 | Iikov et al. ..................... 353/99 |
| 6,583,921 B2 | 6/2003 | Nelson ........................ 359/291 |
| 6,705,735 B1 * | 3/2004 | Chang et al. .................. 353/99 |
| 6,752,500 B1 | 6/2004 | Yoshii et al. ................... 353/78 |
| 6,779,897 B2 | 8/2004 | Konno et al. ................... 353/99 |
| 6,843,570 B2 * | 1/2005 | Shin .............................. 353/99 |
| 6,962,419 B2 | 11/2005 | Huibers ....................... 353/99 |
| 7,252,389 B2 * | 8/2007 | Hatakeyama et al. ......... 353/70 |
| 2004/0125346 A1 | 7/2004 | Huibers ....................... 353/98 |
| 2004/0135976 A1 * | 7/2004 | Ishihara et al. ................ 353/99 |
| 2004/0169829 A1 * | 9/2004 | Kwon .......................... 353/98 |
| 2004/0218152 A1 * | 11/2004 | Jung ........................... 353/69 |

FOREIGN PATENT DOCUMENTS

JP 08-254662 A 10/1996

* cited by examiner

*Primary Examiner*—Andrew T Sever
(74) *Attorney, Agent, or Firm*—Sidley Austin LLP

(57) ABSTRACT

In an image projection apparatus, the deflection axis of the pixels of a display device is parallel to the longer sides of the display area of the display device, and the entrance pupil of a projection optical system is displaced from the line normal to the center of the display area in the direction parallel to the shorter sides of the display device. The distance from the display device to the optical component closest thereto is determined based on the intersection between the lowermost ray of projection light that leaves the lower end of the display area and reaches the entrance pupil of the projection optical system and the uppermost ray of illumination light that leaves the illumination optical system and reaches the upper end of the display device.

7 Claims, 7 Drawing Sheets

ILLUMINATION LIGHT

ILLUMINATION LIGHT

IMAGE PROJECTION APPARATUS

This application is based on Japanese Patent Application No. 2004-253716 filed on Sep. 1, 2004 and Japanese Patent Application No. 2005-236612 filed on Aug. 17, 2005, the contents of which are hereby incorporated by reference.

BACKGROUND OF THE INVENTION

1. Field of the Invention

The present invention relates to an image projection apparatus that displays an image and then projects it, and more particularly to an image projection apparatus employing a reflective display device that displays an image through angle modulation of pixels.

2. Description of Related Art

Many image projection apparatuses use a reflective display device that displays an image through angle modulation of pixels. Such an image projection apparatus is provided with an illumination optical system for directing illumination light to the display device and a projection optical system for projecting image light (that is, light representing an image) from the display device.

Here, the illumination optical system should not intercept the image light (hereinafter also the "projection light"), nor should the projection optical system intercept the illumination light. Thus, the illumination optical system and the projection optical system need to be disposed on separate optical paths, one for the illumination light and another for the projection light. In addition, for miniaturization of the image projection apparatus as a whole, it is preferable that the illumination light and the projection light be separated within a narrow space.

To cope with these requirements, for example, in one conventionally proposed optical projection system (image projection apparatus) disclosed in Japanese Laid-Open Patent Application No. H8-254662 (hereinafter Patent Publication 1), a field lens is provided close to the display device so that improved separation between projection light and illumination light is achieved by the light-converging action of the field lens.

In another conventionally proposed image projection apparatus, a display device is used in which the deflection axis of the pixels runs at 45 degrees relative to both the longer and shorter sides of the display area, and a TIR prism having an air gap is disposed immediately in front of the display device. In this image projection apparatus, through total reflection of selectively either illumination light or projection light, separation between the illumination light and the projection light is achieved.

Image projection apparatuses provided with a field lens, however, are prone to suffer from reflection at the interfaces of the field lens. Such reflection causes ghosts and diminishes contrast. Thus, with these image projection apparatuses, it is impossible to obtain satisfactory image quality.

On the other hand, image projection apparatuses provided with a TIR prism combined with a reflective display device in which the deflection axis of the pixels runs at 45 degrees relative to every side of the display area are already commercially available. These image projection apparatuses, however, are expensive just because the TIR prism itself is expensive. In addition, these image projection apparatuses suffer from a significant loss of light at the air gap surfaces of the TIR prism. Thus, to present images with satisfactory brightness, it is essential to use a high-output light source.

SUMMARY OF THE INVENTION

In view of the conventionally experienced disadvantages discussed above, it is an object of the present invention to provide an image projection apparatus that achieves satisfactory separation between illumination light and projection light without the use of a field lens or a TIR prism.

To achieve the above object, according to a first aspect of the present invention, an image projection apparatus is provided with: a reflective display device that has pixels and that displays an image through angle modulation of the pixels; a light source that emits illumination light for illuminating the display device; an illumination optical system that directs the illumination light from the light source to the display device; and a projection optical system that projects, as image light, light representing the image from the display device.

The above image projection apparatus according to the first aspect of the present invention further has the following features. The deflection axis of the pixels runs parallel to the longer sides of the rectangular display area of the display device. Moreover, the entrance pupil of the projection optical system is located at a position displaced from the line normal to the center of the display area in the direction parallel to the shorter sides of the display area. Moreover, conditional formulae (i) and (ii) below are fulfilled:

$$L \cdot \left\{ \begin{array}{l} \tan\left[\tan^{-1}\left(\tan\alpha + \dfrac{d}{2 \cdot H}\right) - \theta\right] + \\ \tan\left[\tan^{-1}\left(\tan\alpha - \dfrac{d}{2 \cdot H}\right) - \theta + 2 \cdot \chi\right] \end{array} \right\} > d \quad \text{(i)}$$

$$\sin\theta > 0.13 \quad \text{(ii)}$$

where, let the reference direction be the direction of a line normal to the display area of the display device, L represents the distance, in the reference direction, from the display area of the display device to the optical component located closest to the display area of the display device on the optical path;

α represents the angle, to the reference direction, of the direction pointing from the center of the display area of the display device to the center of the entrance pupil of the projection optical system;

d represents the length of the shorter sides of the display area of the display device;

H represents the distance, in the reference direction, from the display area of the display device to the entrance pupil of the projection optical system;

θ represents the arcsine of the numerical aperture of the illumination optical system and the projection optical system as measured in the direction parallel to the shorter sides of the display area of the display device; and χ represents the deflection angle at which the pixels are deflected relative to the display surface of the display device.

In the image projection apparatus constructed as described above, the deflection axis of the pixels of the display device is made to run parallel to the longer sides of the display area of the display device. This helps direct the illumination light and the projection light in directions perpendicular to the longer sides of the display area. In addition, the entrance pupil of the projection optical system is disposed in the direction parallel to the shorter sides of the display area (that is, in the direction perpendicular to the longer sides thereof). This helps increase the degree of deflection of the projection light relative to the illumination light, and thus helps achieve improved separation between the illumination light and the projection light.

Conditional formula (i) defines the condition to be fulfilled to achieve separation between the illumination light and the projection light, and therefore fulfilling it results in superb separation between the illumination light and the projection light. On the other hand, fulfilling conditional formula (ii) helps increase the numerical apertures of the illumination light traveling from the illumination optical system to the display device and of the projection light traveling from the display device to the projection optical system. This helps achieve satisfactory energy transmission efficiency between the two optical systems.

According to another aspect of the present invention, an image projection apparatus is provided with: a reflective display device that has pixels and that displays an image through angle modulation of the pixels; a light source that emits illumination light for illuminating the display device; an illumination optical system that directs the illumination light from the light source to the display device; and a projection optical system that has a plurality of curved-surface mirrors and that projects, as image light, light representing the image from the display device.

The above image projection apparatus according to the second aspect of the present invention further has the following features. The deflection axis of the pixels runs parallel to the longer sides of the rectangular display area of the display device. Moreover, the entrance pupil of the projection optical system is located at a position displaced from the line normal to the center of the display area in the direction parallel to the shorter sides of the display area. Moreover, the exit pupil of the illumination optical system is located at a position displaced from the line normal to the center of the display area in the direction parallel to the shorter sides of the display area but opposite to the direction in which the entrance pupil of the projection optical system is displaced from the line normal to the center of the display area. Moreover, the illumination optical system is so arranged that the image light from the display device passes through the entrance pupil of the projection optical system.

The above and other objects and features of the present invention will be clear in light of the detailed description of preferred embodiments below with reference to the accompanying drawings.

DETAILED DESCRIPTION OF PREFERRED EMBODIMENTS

First Embodiment

Figure 1:
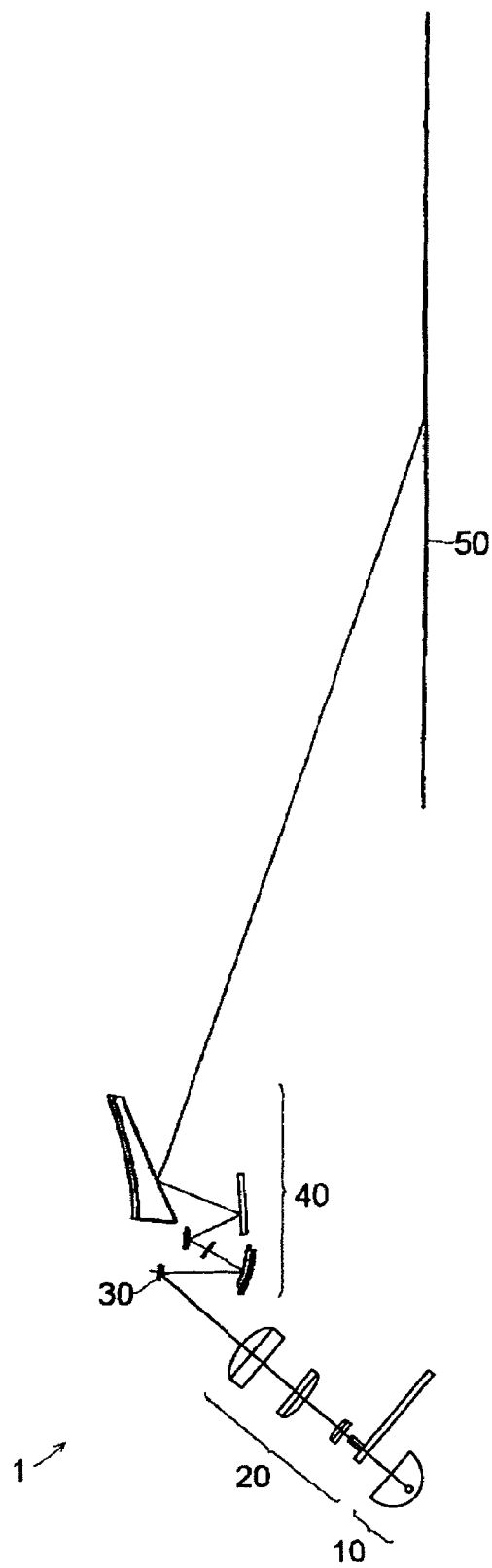
FIG. 1 is a diagram showing the overall optical construction of the image projection apparatus of a first embodiment of the invention.
Figure 2:
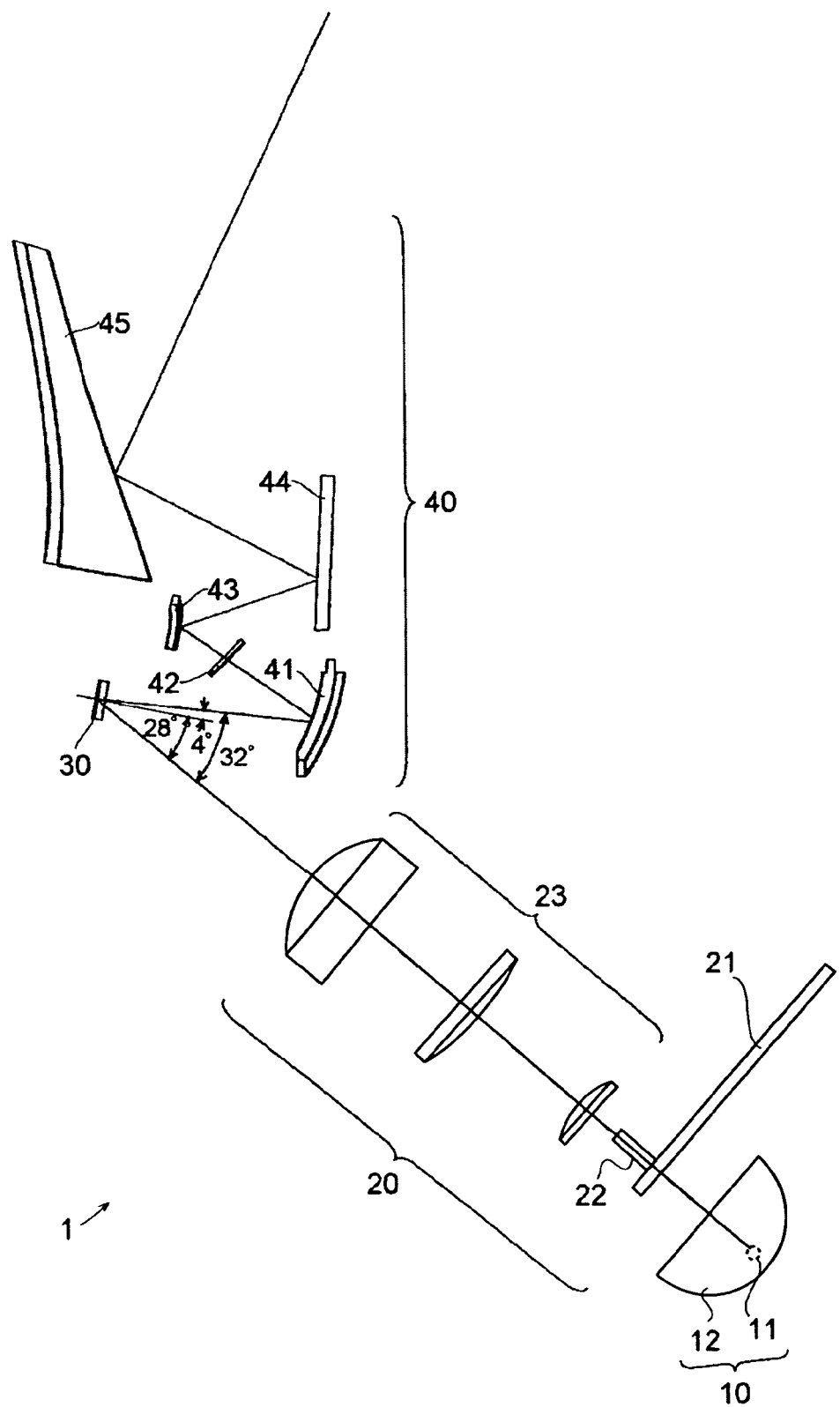
FIG. 2 is a diagram showing the optical construction of a principal portion of the image projection apparatus of FIG. 1.

Hereinafter, embodiments of the present invention will be described with reference to the drawings. FIG. 1 shows the overall optical construction of the image projection apparatus 1 of a first embodiment of the invention. FIG. 2 shows the optical construction of a principal portion of the image projection apparatus 1 of the first embodiment.

The image projection apparatus 1 of this embodiment is provided with a light source 10, an illumination optical system 20, a reflective display device 30, a projection optical system 40, and a screen 50.

The light source 10 includes: a lamp 11 that emits white light; and a reflector 12 that has a surface in the shape of an ellipsoid of revolution. The light source 10 emits illumination light for illuminating the display device 30.

The lamp 11 is disposed at the first focus of the reflector 12, and thus the light emitted from the lamp 11 is reflected from the reflector 12 so as to converge at the second focus thereof.

The illumination optical system 20 includes a color wheel 21, an integrator rod 22, and a relay optical system 23.

The color wheel 21 is provided with three types of filters that selectively transmit red (R), green (G), and blue (B) light, respectively. The color wheel 21 rotates so that, at any given moment, one of the filters is located in the optical path of the illumination light from the light source 10 to convert the illumination light into red (R), green (G), or blue (B) light.

As will be described in detail later, the display device 30 splits one image into R, G, and B color components, and displays those color components in synchronism with the rotation of the color wheel 21. This permits the image projection apparatus 1 to present a color image on a time division basis.

The integrator rod 22 is a transparent member in the shape of a rectangular prism whose cross-sectional shape is geometrically similar to that of the display area (the area in which an image is displayed) of the display device 30. The integrator rod 22 is so disposed that the center of one end surface thereof is located at the second focus of the reflector 12 and that the side surfaces thereof are parallel to the straight line connecting between the first and second focuses of the reflector 12.

The illumination light from the light source 10 passes through the color wheel 21, then enters the integrator rod 22 through the entrance end surface thereof, is then totally reflected on the side surfaces thereof, and then reaches the exit end surface thereof. Here, the illumination light strikes the entrance end surface of the integrator rod 22 at different angles of incidence. The rays of light that have struck the entrance end surface at different angles of incidence are then, as many times as dictated by those angles of incidence, totally reflected on the side surfaces, with the result that the rays then strike different parts of the exit end surface at different angles. This gives the illumination light a uniform intensity distribution on the exit end surface.

Instead of the integrator rod 22, an integrator composed of a lens array may be used. In that case, a reflector that has a surface in the shape of a paraboloid of revolution is used as the reflector 12 so as to form the illumination light from the light source 10 into a parallel beam.

The relay optical system 23 is composed of three lenses, and directs the illumination light from the integrator rod 22 to the display device 30. The relay optical system 23 makes the exit end surface of the integrator rod 22 optically conjugate with a plane that includes the center of the display area of the display device 30, on which plane the relay optical system 23 forms the image of the exit end surface of the integrator rod 22.

The display surface of the display device 30 is not perpendicular to the principal ray of the illumination light from the relay optical system 23. The illuminated area on the plane including the display surface, however, has a shape geometrically substantially similar to that of the rectangular display area, and the display area is illuminated uniformly. Moreover, the relay optical system 23 is so designed that the illuminated area is slightly larger than the display area of the display device 30. This reduces the illumination light that falls outside the display area, and thereby enhances illumination efficiency.

A reflection mirror may be additionally provided on the optical path from the light source 10 to the display device 30. For example, a reflection mirror may be disposed between the display device 30 and the lens of the relay optical system 23 closest to the display device 30. Alternatively, a reflection mirror may be disposed between the lens of the relay optical system 23 closest to the display device 30 and the other lenses of the relay optical system 23. With this construction, for example, the part of the optical path located on the light source 10 side of the reflection mirror is bent in the direction perpendicular to the plane of FIGS. 1 and 2. This makes it possible to reduce the height and thickness of the image projection apparatus.

The reflective display device 30 has a large number of pixels arranged in a two-dimensional array. The display device 30 displays an image through angle modulation of pixels, reflecting the illumination light to produce light (projection light) representing the displayed image. An example of a device that displays an image through angle modulation of pixels is a Digital Micromirror Device™ (DMD™), manufactured by Texas Instruments Incorporated.

The projection optical system 40 includes four mirrors 41, 43, 44, and 45 and one lens 42. The mirrors 41, 43, 44, and 45 each have a spherical, rotation-symmetric aspherical, or free-form surface. The projection optical system 40 directs the projection light from the display device 30 to the screen 50, and forms thereon an enlarged image of the image represented by the projection light. Of the four mirrors, the curved-surface mirror 41 closest to the display device has a concave surface, and the curved-surface mirror 43 second closest to the display device has a convex surface. The lens 42 is disposed between the curved-surface mirrors 41 and 43. The curved-surface mirrors 44 and 45 each have a free-form surface.

The screen 50 is of a transmissive type, and receives the projection light from the direction opposite to the viewer. The principal ray of the projection light (that is, the ray of light that leaves the pixel at the center of the display area of the display device 30) is incident on the screen 50 at an angle of incidence as large as about 70 degrees. The image projection apparatus 1 is thin as compared with the size of the image it presents.

The reflective display device 30 has a large number of tiny deflectable pixels arranged in a two dimensional array, each pixel representing a different point on an image. Each pixel turns (deflects) in a forward and a backward direction about a deflection axis parallel to the display surface of the display device 30 as a whole. For example, each pixel deflects through an angle of ±12 degrees.

Figure 3:
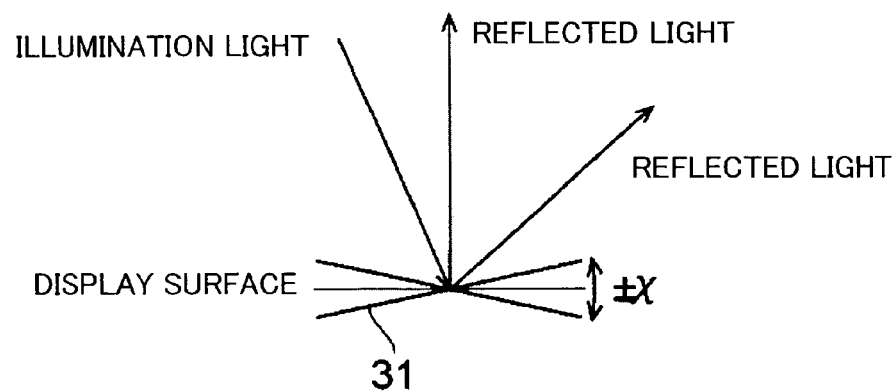
FIG. 3 is a diagram schematically showing how illumination light is reflected by each pixel of the display device.

FIG. 3 shows how the illumination light is reflected by each pixel 31. As shown in FIG. 3, although the illumination light is incident on the display device 30 at a fixed angle of incidence, it is reflected in two different directions depending on the orientation of the pixel 31. The light reflected in one direction is used as the projection light (that is, the light representing an image), and the light reflected in the other direction is handled as unnecessary light. The unnecessary light does not enter the projection optical system 40, but is simply discarded. In the image projection apparatus 1 of this embodiment, the light so reflected as to form the smaller angle relative to the illumination light is used as the projection light.

The display device 30 has a rectangular display area measuring 10.5 mm by 18.6 mm. Each pixel 31 of the display device 30 has the shape of a square measuring 0.014 mm along each side, and can deflect about a deflection axis that runs parallel to two opposite sides of the pixel and crosses the other two opposite sides thereof at their respective midpoints. All the pixels 31 are so disposed that their deflection axis runs parallel to the longer sides of the display area of the display device 30.

Figure 4:
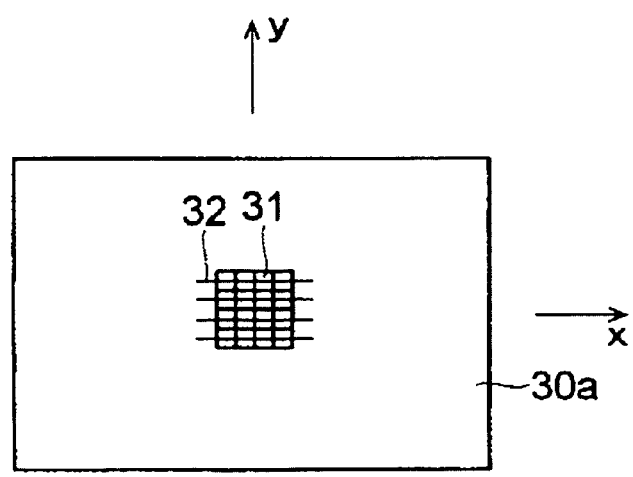
FIG. 4 is a diagram showing the display area of the display device, with some of the pixels thereof shown together.

FIG. 4 shows the display area 30a of the display device, with some of the pixels 31 thereof shown together. In FIG. 4, reference numeral 32 indicates the deflection axis of the pixels 31. In the following description, as shown in FIG. 4, the axis that runs through the center of the display area 30a and is parallel to the longer sides thereof is referred to as the x-axis, and the axis that runs through the center of the display area 30a and is parallel to the shorter sides thereof is referred to as the y-axis. The positive directions of the x- and y-axes are as shown in FIG. 4. Moreover, the axis that runs through the center of the display area 30a and is perpendicular to both the x- and y-axes is referred to as the z-axis. The positive direction of the z-axis points from the plane of FIG. 4 to the viewer.

Figure 5:
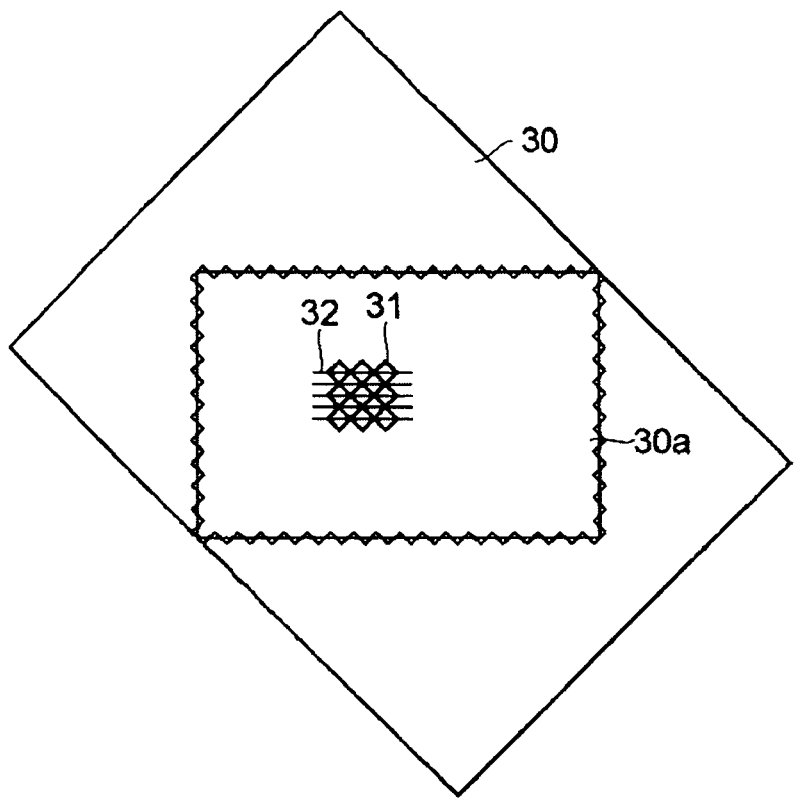
FIG. 5 is a diagram showing another example of a display device that can be used in the image projection apparatus of FIG. 1, with the display area thereof shown together.

Although the example being discussed assumes the use of a display device 30 of which all the pixels 31 are located within the display area 30a, it is also possible to use instead a display device of which the pixels 31 have a different relationship with the display area 30a. For example, it is possible to use, as shown in FIG. 5, a display device 30 in which the deflection axis 32 of the pixels 31 runs in a diagonal direction of the pixels 31 and in which the pixels 31 are arranged in an array whose edges are parallel to the sides of the pixels 31, in which case only part of the pixels 31 are located within the display area 30a. In short, what is important here is that the deflection axis 32 of the pixels 31 run parallel to the longer sides of the display area 30a.

The projection optical system 40 is designed as an optical system that is telecentric at the entrance side thereof (that is, telecentric toward the display device 30), and thus its entrance pupil is located at infinity. What should be noted here is that, while the entrance pupil of the projection optical system 40 is indeed parallel to the display area 30a of the display device 30, the center of the entrance pupil is displaced from the line normal to the center of the display area 30a in the direction parallel to the shorter sides of the display area 30a.

Specifically, the center of the entrance pupil of the projection optical system 40 lies on the plane where x=0, in the range where y>0 and z>0. Moreover, the angle formed between the straight line connecting the center of the display area 30a to the center of the entrance pupil of the projection optical system 40 and the normal to the center of the display area 30a equals 4 degrees.

Although the example being discussed assumes that the inclination angle of the direction of the entrance pupil of the projection optical system 40 relative to the normal to the display surface is 4 degrees, this inclination angle may be any other angle. Here, however, it should be noted that too small an inclination angle makes it difficult to achieve separation between the illumination light and the projection light, and that too large an inclination angle leads to unsatisfactory imaging performance. Hence, it is preferable that the inclination of the direction of the entrance pupil of the projection optical system 40 be 4 to 20 degrees.

The illumination optical system 20 is so disposed that the projection light from the display device 30 passes through the entrance pupil of the projection optical system 40. The center of the exit pupil of the illumination optical system 20 lies in the range where x=0, y<0, and z>0. More specifically, the angle between the straight line connecting the center of the display area 30a of the display device 30 to the center of the exit pupil of the illumination light optical system 20 and the normal to the display surface of the display device 30 equals 28 degrees. Hence, the angle between the principal rays of the illumination light and the projection light equals 32 degrees.

Although the example currently discussed assumes that the angle between the principal rays of the illumination light and the projection light equals 32 degrees, this angle may be any other angle. Here, however, it should be noted that too small an angle makes it difficult to achieve separation between the projection light and the illumination light. Hence, it is preferable that the angle between the principal rays of the illumination light and the projection light equal 30 degrees or more.

In conformity with the projection optical system 40, the illumination optical system 20 too is designed as an optical system that is telecentric at the exit side thereof (that is, telecentric toward the display device 30). In oblique illumination, adopting a telecentric design as practiced here is effective in obtaining a brightness distribution as uniform as possible. The illumination optical system 20, however, does not necessarily have to be a perfectly telecentric optical system. Specifically, a difference within about ±5 degrees is well acceptable in the angle between the principal ray of the illumination light directed to the center of the display area 30a and the principal ray of the illumination light directed to the periphery of the display area 30a.

The numerical aperture (NA) of the projection optical system 40 and the illumination optical system 20 is 0.14, which corresponds to F3.5. On the other hand, the optical component closest to the display area 30a of the display device 30 is the mirror 41 included in the projection optical system 40, and the distance from the display area 30a to the part of the mirror 41 closest to the display device (as measured in the direction of a line normal to the display surface of the display device 30) is 75 mm. In this way, it is possible to achieve sufficient separation between the projection light and the illumination light while securing a large numerical aperture.

The numerical aperture may be varied. Here, however, it should be noted that too small a numerical aperture reduces the energy transmission efficiency from the illumination optical system 20 to the projection optical system 40, and that too large a numerical aperture lowers the imaging performance of the projection optical system 40. Hence, it is preferable that the numerical aperture of the illumination optical system 20 and the projection optical system 40 be 0.13 to 0.25.

The image projection apparatus 1 of this embodiment is provided with a reflective display device 30 in which the deflection axis 32 of the pixels 31 runs parallel to the longer sides of the rectangular display area 30a, so that an image is displayed through angle modulation of the pixels 31. In the image projection apparatus 1 constructed in this way, when formula (1) (conditional formula (i)) below is fulfilled, the illumination optical system 20 and the projection optical system 40 can be disposed on separate optical paths, one for the illumination light and another for the projection light.

$$L \cdot \left\{ \begin{array}{l} \tan\left[\tan^{-1}\left(\tan\alpha + \frac{d}{2 \cdot H}\right) - \theta\right] + \\ \tan\left[\tan^{-1}\left(\tan\alpha - \frac{d}{2 \cdot H}\right) - \theta + 2 \cdot \chi\right] \end{array} \right\} > d \qquad (1)$$

When formula (2) (conditional formula (ii)) below is fulfilled in addition, satisfactory energy transmission efficiency can be achieved between the illumination optical system 20 and the projection optical system 40.

$$\sin \theta > 0.13 \qquad (2)$$

The variables used in formulae (1) and (2) are defined as follows:

L represents the distance, in the direction normal to the display area, from the display area of the display device to the optical component located closest to the display area of the display device on the optical path;

α represents the angle, to the direction normal to the display area, of the direction pointing from the center of the display area of the display device to the center of the entrance pupil of the projection optical system;

d represents the length of the shorter sides of the display area of the display device;

H represents the distance, in the direction normal to the display area, from the display area of the display device to the entrance pupil of the projection optical system;

θ represents the arcsine of the numerical aperture of the illumination optical system and the projection optical system as measured in the direction parallel to the shorter sides of the display area of the display device; and χ represents the deflection angle at which the pixels are deflected relative to the display surface of the display device.

More specifically, L represents the distance, in the direction normal to the display area, from the display area of the display device to, of the optical component located closest to the display area on the optical path, the part closest to the display device. H represents the distance, in the direction normal to the display area, from the display area of the display device to the center of the entrance pupil of the projection optical system. In a case where the illumination optical system and the projection optical system have different numerical apertures, θ represents the arcsine of whichever numerical aperture is smaller.

Figure 6:
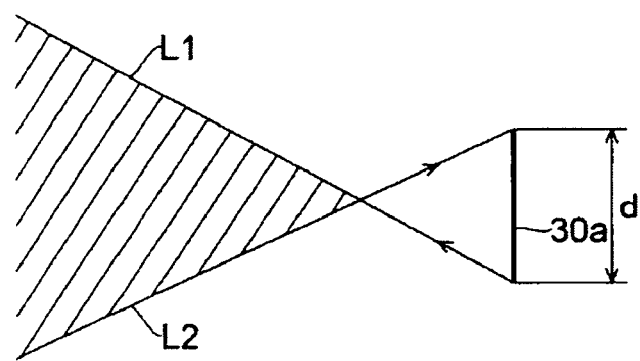
FIG. 6 is a diagram schematically showing the lowermost ray of the projection light that leaves the lower end of the display area and reaches the entrance pupil of the projection optical system and the uppermost ray of the illumination light that leaves the illumination optical system and reaches the upper end of the display area.

FIG. 6 is a diagram schematically showing the display device 30 as viewed from the direction of the longer sides (the x-axis direction) of the display area 30a. In FIG. 6, L1 indicates the lowermost ray of the projection light that leaves the lower end of the display area 30a and reaches the entrance pupil of the projection optical system 40, and L2 indicates the uppermost ray of the illumination light that leaves the illumination optical system 20 and reaches the upper end of the display area 30a. The direction of the shorter sides (the y-axis direction) of the display area 30a is referred to as the vertical direction, with the positive and negative parts of the y-axis pointing up and down, respectively.

Thus, formula (1) signifies that, as shown in FIG. 6, the optical component is located farther from the display area 30a than is the intersection between the rays L1 and L2 (that is, it is located in the range hatched in FIG. 6).

The term $d/(2 \cdot H)$ in formula (1) indicates the degree of telecentricity. In a perfectly telecentric optical system, the term $d/(2 \cdot H)$ equals zero, in which case formula (1) is rearranged to formula (3) (conditional formula (iii)) below. In practical terms, so long as the arcsine of the degree of telecentricity is within ±5 degrees, an optical system can be designed without any notable problem by the use of formula (3) instead of formula (1).

$$L \cdot [\tan(\alpha-\theta)+\tan(\alpha-\theta+2\cdot\chi)] > d \qquad (3)$$

Incidentally, in a case where the direction of the entrance pupil of a projection optical system is inclined (that is, the entrance pupil is displaced) without the use of a field lens or a TIR prism, too large an inclination angle makes it difficult to obtain satisfactory imaging performance in the projection optical system, and too small an inclination angle makes it impossible to achieve a proper balance between a satisfactory numerical aperture and separation between projection light and illumination light.

In a common image projection apparatus, the deflection axis of the pixels of a display device runs 45 degrees relative to both the longer and shorter sides of the display area. As compared with this construction, the construction of the image projection apparatus 1 of this embodiment, where the deflection axis 32 of the pixels 31 runs parallel to the longer sides of the display area 30a, helps reduce the inclination angle that needs to be given to the entrance pupil of the projection optical system 40 to achieve between projection light and illumination light. This helps secure a large numerical aperture, permits an easy layout of the projection optical system 40 and the illumination optical system 20, and thus helps obtain high transmission efficiency. Now, how these advantages arise will be explained.

In the image projection apparatus 1 of this embodiment, the deflection axis of the pixels runs parallel to the longer sides of the display area, and the entrance pupil of the projection optical system is displaced in the direction parallel to the shorter sides of the display area (that is, in the direction perpendicular to the display area). In this construction, the vector vP pointing from the center of the display area of the display device to the center of the entrance pupil of the projection optical system (this vector is referred to as the projection optical system entrance pupil direction vector) is given by formula (4) below, and the vector vDon of a line normal to the pixels that produce the projection light is given by formula (5) below.

$$vP = \begin{pmatrix} 0 \\ \sin\alpha \\ \cos\alpha \end{pmatrix} \qquad (4)$$

$$vD_{on} = \begin{pmatrix} 0 \\ -\sin\chi \\ \cos\chi \end{pmatrix} \qquad (5)$$

When, for higher optical system efficiency, the entrance pupil of the projection optical system and the exit pupil of the illumination optical system are located on an identical optical axis, then, based on formulae (4) and (5), the angle γ between the principal ray of the projection light and the principal ray of the illumination light (this angle is referred to as the principal ray separation angle) fulfills the relationship given by formula (6) below. Hence, formula (7) below holds.

$$\cos\left(\frac{\gamma}{2}\right) = -\sin\chi \cdot \sin\alpha + \cos\chi \cdot \cos\alpha \qquad (6)$$

$$\gamma = 2 \cdot \cos^{-1}(-\sin\chi \cdot \sin\alpha + \cos\chi \cdot \cos\alpha) \qquad (7)$$

On the other hand, in a construction where the deflection axis of the pixels runs at 45 degrees relative to the longer and shorter sides of the display area, the vector vDon of the direction of a line normal to the pixels that produce the projection light is given by formula (8) below.

$$vD_{on} = \begin{pmatrix} \dfrac{\sin\chi}{\sqrt{2}} \\ -\dfrac{\sin\chi}{\sqrt{2}} \\ \cos\chi \end{pmatrix} \qquad (8)$$

When, for higher optical system efficiency, the entrance pupil of the projection optical system and the exit pupil of the illumination optical system are located on an identical optical axis, then, based on formulae (4) and (8), the principal ray separation angle γ between the projection light and the illumination light fulfills the relationship given by formula (9) below. Hence, formula (10) below holds.

$$\cos\left(\frac{\gamma}{2}\right) = -\frac{1}{2} \cdot \sin\chi \cdot \sin\alpha + \cos\chi \cdot \cos\alpha \qquad (9)$$

$$\gamma = 2 \cdot \cos^{-1}\left(-\frac{1}{2} \cdot \sin\chi \cdot \sin\alpha + \cos\chi \cdot \cos\alpha\right) \qquad (10)$$

Figure 7:
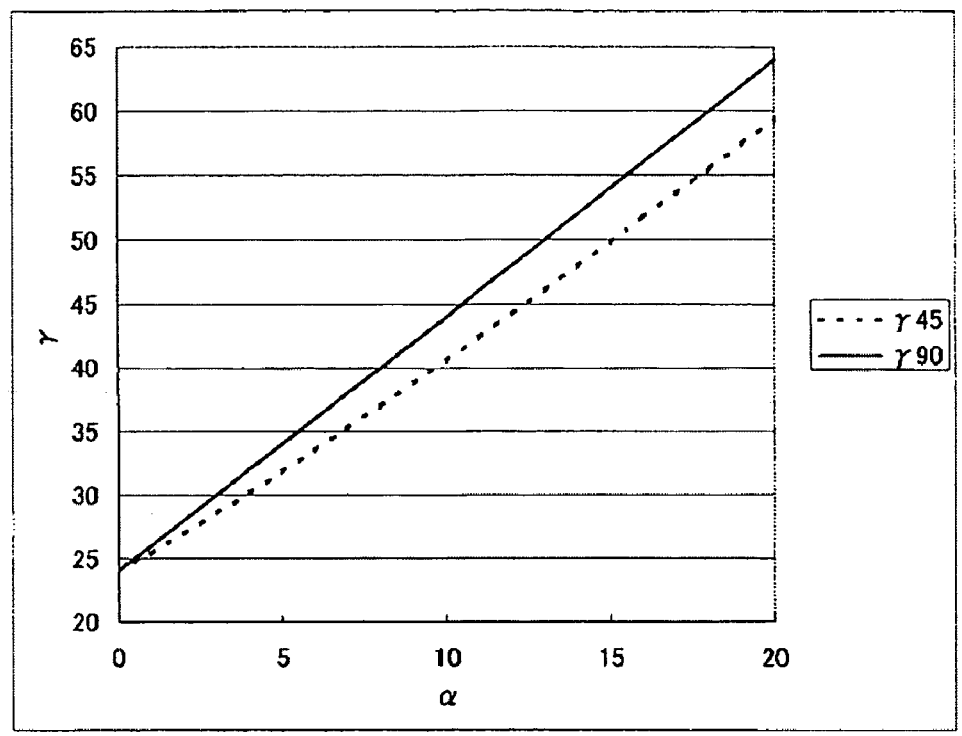
FIG. 7 is a diagram showing the relationship between the direction of the entrance pupil of the projection optical system and the angle between the principal rays of the projection and illumination light.

FIG. 7 shows the relationship between the inclination angle α of the direction of the entrance pupil of the projection optical system and the principal ray separation angle γ between the projection light and the illumination light. In FIG. 7, γ90 indicates the construction in which the deflection axis of the pixels runs parallel to the longer sides of the display area, and γ45 indicates the construction in which, as when a conventional DMD is used, the deflection axis of the pixels runs at 45 degrees relative to the longer and shorter sides of the display area. In either case, the deflection angle χ of the pixels is assumed to be 12 degrees.

FIG. 7 shows that, assuming that the inclination angle α of the direction of the entrance pupil is equal, the construction in which, as in the image projection apparatus 1 of this embodiment, the deflection axis of the pixels runs parallel to the longer sides of the display area offers a larger principal ray separation angle γ. That is, assuming that the numerical aperture is equal, making the deflection axis of the pixels parallel to the longer sides of the display area permits an easy layout even when the inclination angle α of the entrance pupil of the projection optical system is made small. Thus, with the image projection apparatus 1 of this embodiment, it is easy to achieve satisfactory imaging in the projected image.

Accordingly, assuming that the inclination angle α of the direction of the entrance pupil of the projection optical system is equal, making the deflection axis of the pixels parallel to the longer sides of the display area permits an easy layout even when the numerical aperture is made large. Thus, with the image projection apparatus 1, it is possible to achieve higher energy transmission efficiency and thereby obtain higher brightness in the projected image.

In this embodiment, the projection optical system 40 uses a plurality of curved-surface mirrors to project an image on the screen 50 while enlarging it. In a projection optical system 40 of a reflective type like this, to prevent an overlap between the light striking a curved-surface mirror and the light leaving it, curved-surface mirrors are so arranged as to bend the central ray of the light they affect.

Generally, the smaller the angle of incidence at which light is incident on a reflective surface, the lower the degree of mirror eccentricity, and thus the higher the performance of the optical system that includes the reflective surface. The lower the degree of mirror eccentricity, the smaller the mirror reflective surface can be made.

Out of these considerations, in the projection optical system 40 of this embodiment, the projection light is bent by the curve-surfaced mirrors in such a way that the central ray of the light traveling from the center of the display device to the center of the screen is included in a plane parallel to the shorter sides of the display device 30. This is because the beam width is smaller and thus the mirror eccentricity is lower in the direction of the shorter sides of the display device than in the direction of the longer sides thereof.

Making the deflection axis of the pixels parallel to the longer sides of the display area as in the image projection apparatus 1 of this embodiment makes it easy to build a construction in which the central ray is bent within a plane parallel to the shorter sides of the display device. Moreover, since the inclination angle α of the entrance pupil of the projection optical system 40 is small, the illumination light is satisfactorily transmitted to the pupil of the projection optical system 40. This makes it possible to realize a high-performance projection optical system 40 composed of compact curved-surface mirror.

Second Embodiment

A second embodiment of the present invention will be described below. As described above, in the image projection apparatus 1 of the first embodiment, of the light reflected from each pixel in two different direction (see FIG. 3), that so reflected as to form the smaller angle relative to the illumination light is used as the projection light, and that so reflected as to form the larger angle is handled as unnecessary light. With this design, however, diminished contrast may result because of the pixels that produce unnecessary light.

Figure 8A:
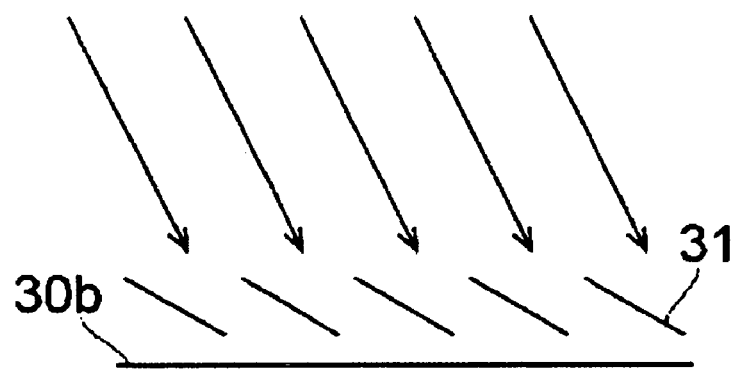
FIG. 8A is a diagram illustrating how diminished contrast is caused by a group of contiguously located pixels generating unnecessary light.

Why this happens is illustrated in FIG. 8A. FIG. 8A shows a group of contiguously located pixels 31 producing unnecessary light. When producing unnecessary light, the pixels 31 are oriented closer to parallel to the illumination light. As a result, as shown in FIG. 8A, if a group of contiguously located pixels 31 produce unnecessary light, part of the illumination light passes between the pixels 31.

The illumination light that has passed between the pixels 31 is then reflected on the substrate 30b or the like supporting the pixels 31 and is thereby scattered. Thus, part of the scattered light mixes with the projection light. As a result, part of the projected image that should appear black becomes brighter than it should be, resulting in diminished contrast. To avoid this, in this embodiment, of the light reflected from each pixel 31 in two different directions, that so reflected as to form the larger angle relative to the illumination light is used as the projection light, and that so reflected as to form the smaller angle relative to the illumination light is handed as unnecessary light. This helps prevent diminished contrast.

Figure 8B:
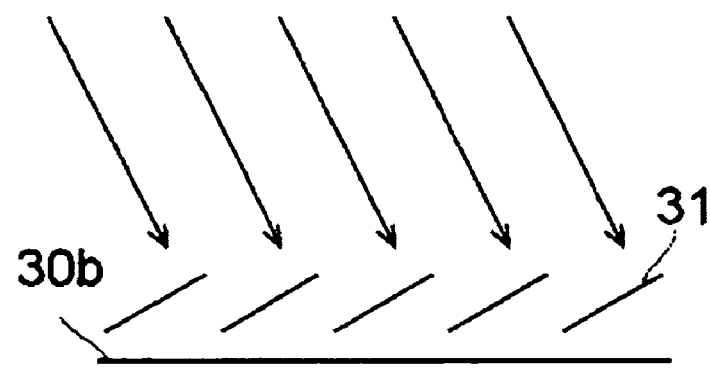
FIG. 8B is a diagram showing the arrangement used in the image projection apparatus of a second embodiment of the invention to prevent diminishing of contrast.

FIG. 8B shows a group of contiguously located pixels 31 producing unnecessary light in the image projection apparatus 2 of this embodiment. Here, as shown in FIG. 8B, even when a group of contiguously located pixels 31 produce unnecessary light, no part of the illumination light passes between the pixels 31. In this way, diminished contrast is prevented.

Figure 9:
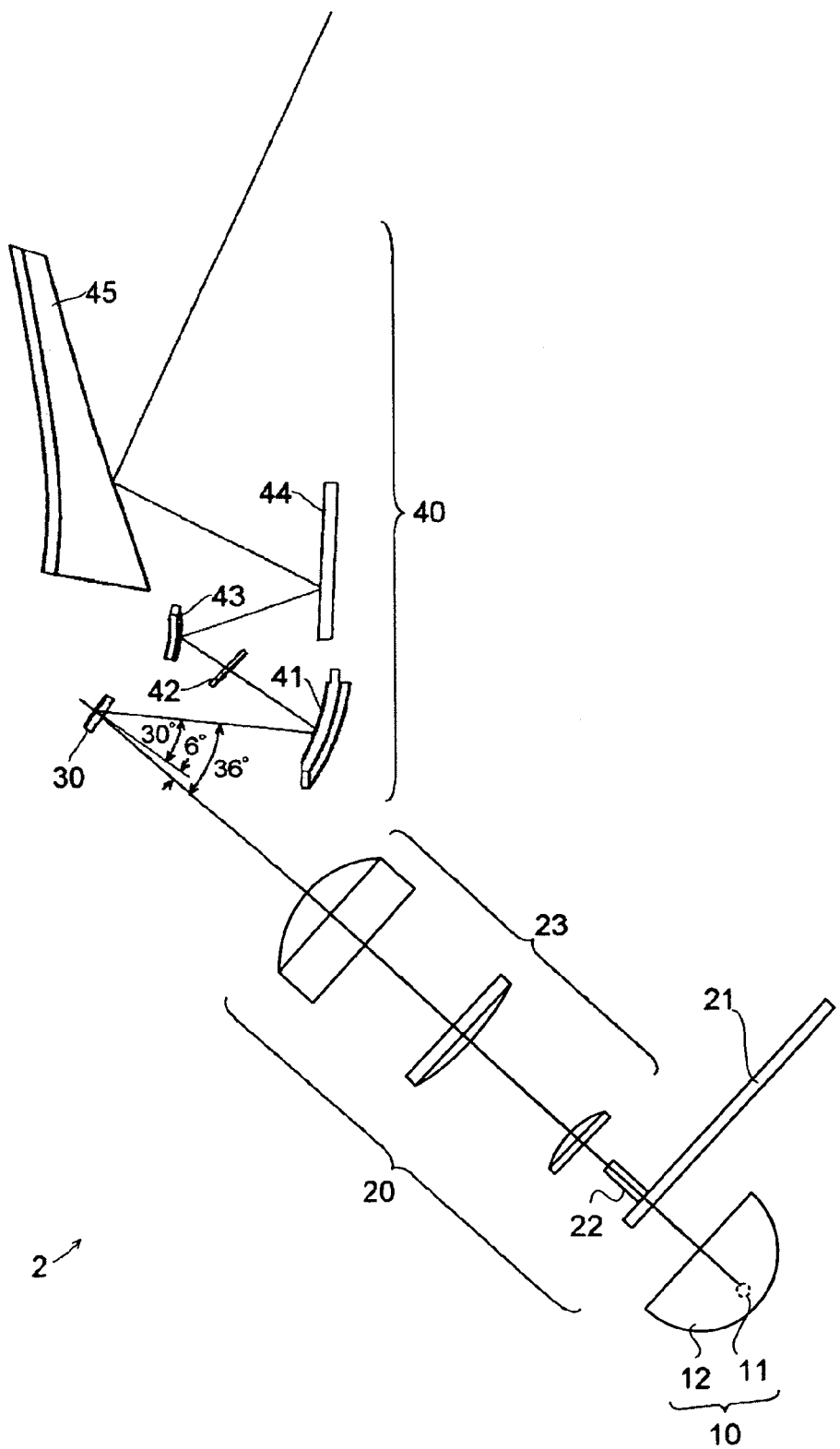
FIG. 9 is a diagram showing the optical construction of a principal portion of the image projection apparatus of the second embodiment.

FIG. 9 shows the optical construction of a principal portion of the image projection apparatus 2 of this embodiment. The construction of this image projection apparatus 2 differs from that of the image projection apparatus 1 of the first embodiment in the angle of the illumination light relative to the reflective display device 30 and the angle of the projection light produced by the display device 30.

In the image projection apparatus 2 of this embodiment, the projection optical system 40 is designed as an optical system that is telelcentric at the entrance side thereof (that is, telecentric toward the display device 30), and the illumination optical system 20 is designed as an optical system that is telelcentric at the exit side thereof (that is, telecentric toward the display device 30). Moreover, the entrance pupil of the projection optical system 40 is displaced from the line normal to the center of the display area in the direction parallel to the shorter sides of the display area. Moreover, the angle between the straight line connecting the center of the display area to the center of the entrance pupil of the projection optical system 40 and the line normal to the center of the display area equals 30 degrees.

Here, since, of the light reflected from each pixel in two different directions, that so reflected as to form the larger angle relative to the illumination light is used as the projection light and that so reflected as to form the smaller angle relative to the illumination light is handled as unnecessary light, the inclination of the illumination light relative to the display device 30 in the image projection apparatus 2 is smaller than the inclination of the illumination light relative to the display device 30 in the image projection apparatus 1.

Specifically, the angle between the straight line connecting the center of the display area of the display device 30 to the center of the exit pupil of the illumination optical system 20 and the line normal to the center of the display area equals 6 degrees. This comparatively small illumination angle helps obtain a more uniform brightness distribution on the display device 30.

The angle δon formed between a line normal to the pixels producing the projection light and the illumination light is given by formula (11) below, and the angle δoff formed between a line normal to the pixels producing unnecessary light and the illumination light is given by formula (12) below.

$$\delta_{on} = \frac{\gamma}{2} = \cos^{-1}(\sin\chi \cdot \sin\alpha + \cos\chi \cdot \cos\alpha) \quad (11)$$

$$\delta_{off} = \cos^{-1}\left[\begin{array}{c} -(3-4\cdot\sin^2\chi)\cdot\sin\chi\cdot\sin\alpha + \\ (3-4\cdot\cos\chi)\cdot\cos\chi\cdot\cos\alpha \end{array}\right] \quad (12)$$

The deflection angle χ of the pixels is ±12 degrees, and the angle between a line normal to the display surface and the illumination light is 6 degrees. Hence, δon equals 6 degrees, δoff equals 18 degrees, and thus δon≧δoff. The projection light and the unnecessary light travel on opposite sides of the illumination light. That is, the illumination light is directed to the display device 30 through between the projection light and the unnecessary light.

When the angle δoff between a line normal to the pixels producing unnecessary light and the illumination light is set equal to or smaller than one-half of the deflection angle χ of the pixels (such that δoff≦χ/2), no part of the illumination light passes between the pixels. This helps prevent diminished contrast. Specifically, when the deflection angle χ equals ±12 degrees, it is preferable to set the angle δoff such that δoff≦6°.

With the image projection apparatuses 1 and 2 of the embodiments described above, it is possible to achieve superb separation between illumination light and projection light without the use of a field lens or a TIR prism. Thus, the image projection apparatuses 1 and 2 of these embodiments can present bright, high-quality images despite being inexpensive. Those image projection apparatuses are therefore suitable for use in projection television monitors.

Image projection apparatuses according to the present invention, of which a few examples have been presented above, can alternatively be defined as follows.

An image projection apparatus according to the present invention may include an integrator that illuminates an area including the display area of the display device and is geometrically substantially similar to the display area of the display device. With this construction, an even brightness distribution is obtained on the display device, and thus images can be presented with even brightness. Moreover, illumination light suffers less loss.

An image projection apparatus according to the present invention may include an illumination optical system that is telecentric at the exit side thereof and a projection optical system that is telecentric at the entrance side thereof, and in addition fulfill formula (3) (conditional formula (iii)) below.

$$L\cdot[\tan(\alpha-\theta)+\tan(\alpha-\theta+2\cdot\chi)]>d \quad (3)$$

Generally, directing illumination light obliquely to a display device tends to cause an uneven brightness distribution on the display device. Using a telecentric optical system helps alleviate the unevenness of a brightness distribution.

Moreover, since formula (3) defines the condition for separation between illumination light and projection light in a telecentric optical system, fulfilling formula (3) helps achieve superb separation.

An image projection apparatus according to the present invention may fulfill conditional formula (13) (conditional formula (iv)) below.

$$30°≦γ \quad (13)$$

where

γ represents the angle between the principal ray of the illumination light traveling to the center of the display area of the display device and the principal ray of the image light traveling from the center of the display area of the display device.

An image projection apparatus according to the present invention may fulfill conditional formulae (14) and (15) (conditional formulae (v) and (vi)) below.

$$4°≦α≦20° \quad (14)$$

$$0.13≦\sin θ≦0.25 \quad (15)$$

Fulfilling formulae (13) or (14) makes it easier to achieve superb separation between illumination light and projection light. On the other hand, fulfilling formula (15) helps obtain satisfactory imaging performance while keeping the transmission efficiency of the optical system high.

An image projection apparatus according to the present invention may include, as a display device, a digital micromirror device.

An image projection apparatus according to the present invention may include a projection optical system including four curved-surface mirrors.

An image projection apparatus according to the present invention may include a projection optical system that includes a lens between a first mirror and a second mirror as counted from a display device side thereof.

As described above, in image projection apparatuses according to the present invention as exemplified by the first and other embodiments thereof, the entrance pupil of the projection optical system is displaced in the direction parallel to the shorter sides of the display area. This helps increase the degree of deflection of the projection light relative to the illumination light, and thus helps achieve improved separation between the illumination light and the projection light. Moreover, fulfilling formula (1) (conditional formula (i)) permits superb separation between the illumination light and the projection light, and eliminates the need to use a field lens or a TIR prism for separation. This helps avoid the earlier mentioned disadvantages attributable to a field lens or a TIR prism. Furthermore, fulfilling formula (2) (conditional formula (ii)) helps obtain satisfactory energy transfer efficiency between the illumination optical system and the projection optical system.

It should be understood that the embodiments and the like specifically described above are simply meant to clarify the technical idea of the present invention; that is, the present invention can be carried out in any manners other than specifically described above, and many modifications and variations are possible within the scope and spirit of the appended claims.

What is claimed is:

1. An image projection apparatus comprising:
   a reflective display device that has pixels and that displays an image through angle modulation of the pixels;
   a light source that emits illumination light for illuminating the display device;
   an illumination optical system that directs the illumination light from the light source to the display device; and
   a projection optical system that has four curved-surface mirrors and that projects, as image light, light representing the image from the display device,
   wherein a deflection axis of the pixels is parallel to longer sides of a rectangular display area of the display device,
   wherein a center of an entrance pupil of the projection optical system is located at a position displaced from a line normal to a center of the display area in a direction parallel to shorter sides of the display area,
   wherein a center of an exit pupil of the illumination optical system is located at a position displaced from the line normal to the center of the display area in the direction parallel to the shorter sides of the display area but opposite to the direction in which the center of the entrance pupil of the projection optical system is displaced from the line normal to the center of the display area,
   wherein the illumination optical system is so arranged that the image light from the display device passes through the entrance pupil of the projection optical system, and
   wherein the projection optical system has a lens between a first mirror and a second mirror as counted from a display device side thereof.

2. The image projection apparatus of claim 1, wherein conditional formulae (i) and (ii) below are fulfilled:

$$L \cdot \left\{ \begin{array}{l} \tan\left[\tan^{-1}\left(\tan\alpha + \dfrac{d}{2 \cdot H}\right) - \theta\right] + \\ \tan\left[\tan^{-1}\left(\tan\alpha - \dfrac{d}{2 \cdot H}\right) - \theta + 2 \cdot \chi\right] \end{array} \right\} > d \quad \text{(i)}$$

$$\sin\theta > 0.13 \quad \text{(ii)}$$

where, let a reference direction be a direction of a line normal to the display area of the display device, L represents a distance, in the reference direction, from the display area of the display device to an optical component located closest to the display area of the display device on an optical path;

α represents an angle, to the reference direction, of a direction pointing from the center of the display area of the display device to the center of the entrance pupil of the projection optical system;

d represents a length of the shorter sides of the display area of the display device;

H represents a distance, in the reference direction, from the display area of the display device to the entrance pupil of the projection optical system;

θ represents an arcsine of a numerical aperture of the illumination optical system and the projection optical system as measured in a direction parallel to the shorter sides of the display area of the display device; and χ represents a deflection angle at which the pixels are deflected relative to a display surface of the display device.

3. The image projection apparatus of claim 2, wherein the illumination optical system comprises an integrator optical system that illuminates an area including the display area of the display device and is geometrically substantially similar to the display area of the display device.

4. The image projection apparatus of claim 2, wherein the illumination optical system is telecentric both at an exit side and an entrance side thereof, and fulfills conditional formula (iii) below:

$$L \cdot [\tan(\alpha - \theta) + \tan(\alpha - \theta + 2 \cdot \chi)] > d \quad \text{(iii).}$$

5. The image projection apparatus of claim 2, wherein conditional formula (iv) below is fulfilled:

$$30° \leq \gamma \quad \text{(iv)}$$

where

γ represents an angle between a principal ray of the illumination light traveling to the center of the display area of the display device and a principal ray of the image light traveling from the center of the display area of the display device.

6. The image projection apparatus of claim 2, wherein conditional formulae (v) and (vi) below are fulfilled:

$$4° \leq \alpha \leq 20° \quad \text{(v)}$$

$$0.13 \leq \sin\theta \leq 0.25 \quad \text{(vi).}$$

7. The image projection apparatus of claim 1, wherein the display device is a digital micromirror device.

* * * * *